(12) United States Patent
Yeh et al.

(10) Patent No.: US 10,641,543 B2
(45) Date of Patent: May 5, 2020

(54) CAMERA ASSEMBLY AND REFRIGERATOR EMPLOYING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jung-Chun Yeh, New Taipei (TW); Ke-Peng Yi, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 69 days.

(21) Appl. No.: 15/869,088

(22) Filed: Jan. 12, 2018

(65) Prior Publication Data

US 2019/0113268 A1 Apr. 18, 2019

(30) Foreign Application Priority Data

Oct. 18, 2017 (CN) .......................... 2017 1 0971716

(51) Int. Cl.
| | |
|---|---|
| F25D 23/02 | (2006.01) |
| H04N 7/18 | (2006.01) |
| F25D 11/00 | (2006.01) |
| G03B 17/56 | (2006.01) |
| F25D 23/12 | (2006.01) |

(52) U.S. Cl.
CPC ............ *F25D 23/028* (2013.01); *F25D 11/00* (2013.01); *F25D 23/12* (2013.01); *G03B 17/561* (2013.01); *H04N 7/18* (2013.01); *H04N 7/183* (2013.01)

(58) Field of Classification Search
CPC ........ F25D 23/028; F25D 11/00; F25D 23/12; G03B 17/561
See application file for complete search history.

(56) References Cited

U.S. PATENT DOCUMENTS

| 9,995,528 B1* | 6/2018 | Ebrom ................ F25D 29/00 |
|---|---|---|
| 2016/0033194 A1* | 2/2016 | Sumihiro ............ F25D 23/04 62/125 |
| 2016/0138860 A1* | 5/2016 | Kang .................. F25D 29/00 62/130 |
| 2016/0178263 A1* | 6/2016 | Grimminger ........ G06T 5/006 348/143 |
| 2016/0223250 A1* | 8/2016 | Kang .................. F25D 29/00 |
| 2017/0041520 A1* | 2/2017 | Carlotto ............. H04N 5/2252 |
| 2017/0234602 A1* | 8/2017 | Seo .................... F21V 33/00 348/151 |
| 2017/0350644 A1* | 12/2017 | Xia .................... F25D 23/02 |
| 2018/0031302 A1* | 2/2018 | Park ................... E05D 11/0054 |
| 2018/0031312 A1* | 2/2018 | Kim ................... F25D 23/028 |

(Continued)

FOREIGN PATENT DOCUMENTS

| CN | 107120500 A | 9/2017 |
|---|---|---|
| CN | 107238246 A | 10/2017 |

*Primary Examiner* — Kun Kai Ma
(74) *Attorney, Agent, or Firm* — ScienBiziP, P.C.

(57) ABSTRACT

A camera assembly coupled to a door of a refrigerator so as to have an unimpeded view of all goods in the refrigerator for the information of a user includes a locking base, a securing base, and a camera. The locking base is coupled to the door. The securing base is coupled to the locking base. The camera is received in the securing base. A refrigerator employing the camera assembly is also provided.

19 Claims, 5 Drawing Sheets

(56) References Cited

U.S. PATENT DOCUMENTS

2018/0172343 A1* 6/2018 Grimminger ............ F25D 29/00
2018/0202709 A1* 7/2018 Chen ..................... F25D 29/005
2018/0245840 A1* 8/2018 Chen ..................... H04N 5/2257
2018/0335252 A1* 11/2018 Oh ........................ F25D 29/005

* cited by examiner

CAMERA ASSEMBLY AND REFRIGERATOR EMPLOYING SAME

FIELD

The subject matter herein generally relates to a camera assembly and a refrigerator employing the camera assembly.

BACKGROUND

Many refrigerators include a camera assembly. However, quantity of cameras and structure make it complicated for assembling, which may affect a whole function of the refrigerator.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
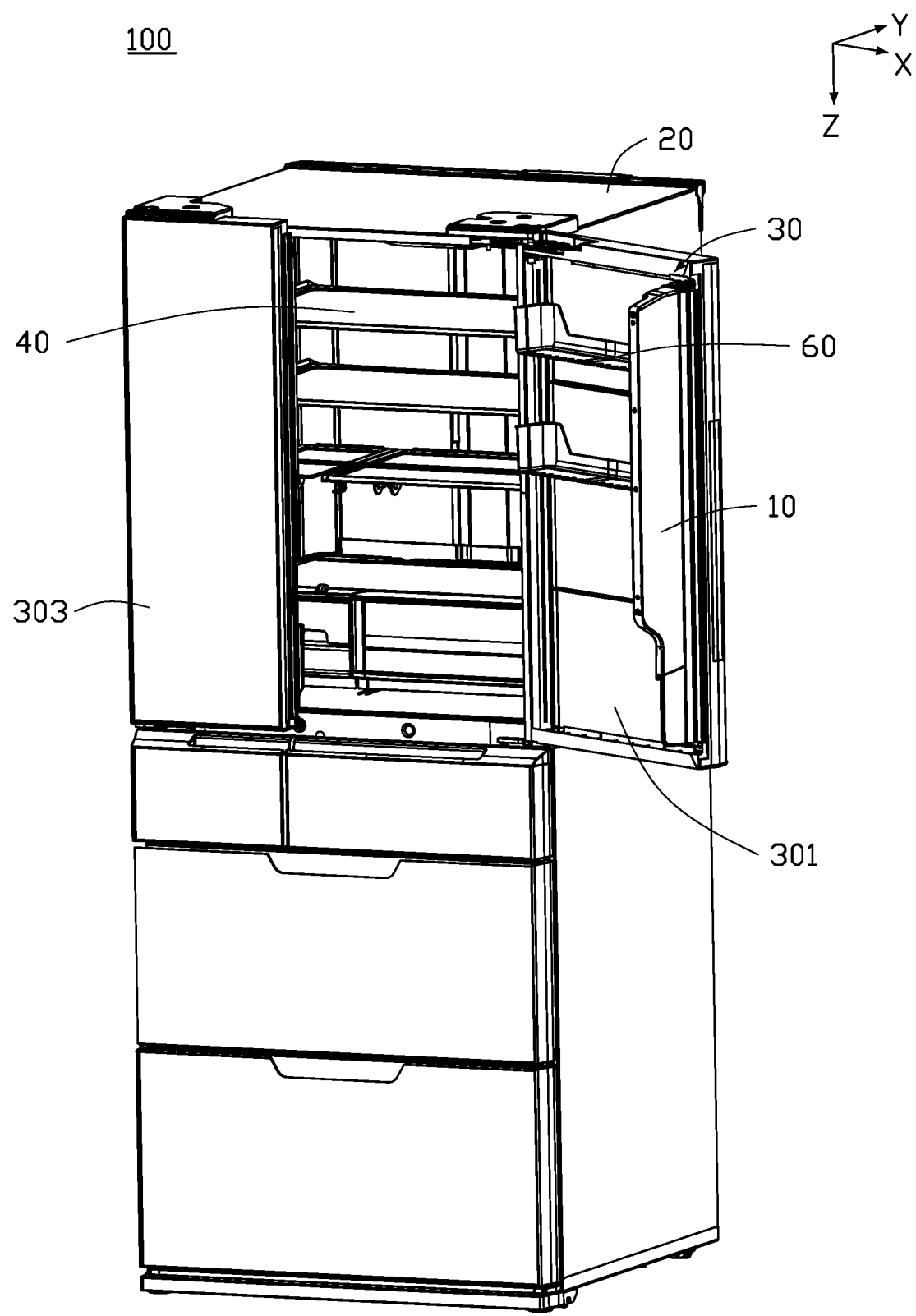
FIG. 1 is an isometric view of an exemplary embodiment of a refrigerator employing a camera assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
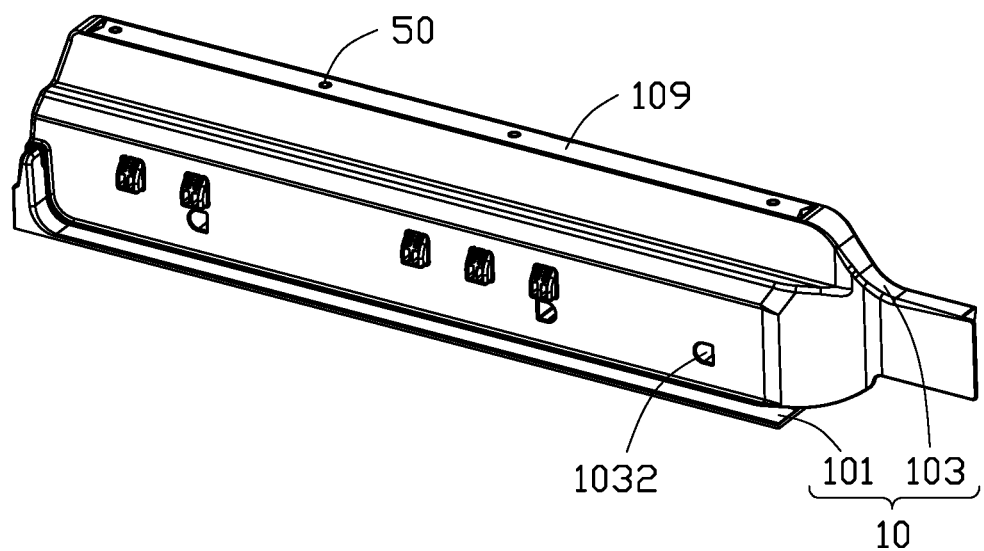
FIG. 2 is an isometric view of the camera assembly of FIG. 1.

FIGS. 1 and 2 illustrate a refrigerator 100. The refrigerator 100 includes a camera assembly 10, a body 20, and a door 30. The body 20 includes a shelf 40. The shelf 40 is for storing goods. The door 30 is coupled to the body 20 and can be opened and closed to the body 20. The camera assembly 10 is coupled to the door 30. When the door 30 is closed, the camera assembly 10 faces the body 20. In at least one embodiment, the door 30 includes an inner surface 301 facing the body 20 and an outer surface 303 facing away from the body 20.

Figure 3:
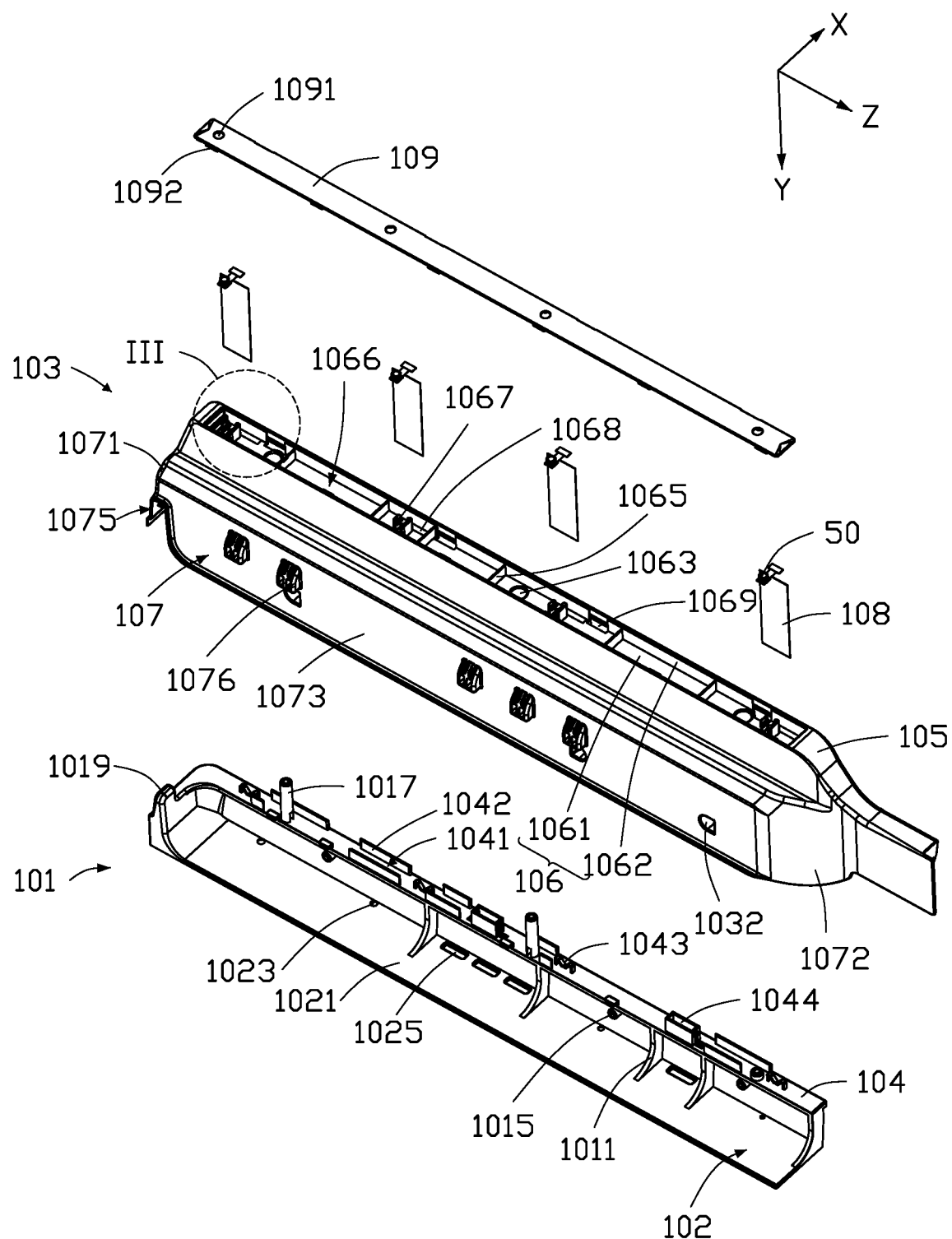
FIG. 3 is an exploded view of the camera assembly of FIG. 2.

FIGS. 2 and 3 illustrate that the camera assembly 10 includes a camera 50. The camera assembly 10 further includes a locking base 101 and a securing base 103. The securing base 103 is coupled to the inner surface 301 through the locking base 101. The securing base 103 is for securing the camera 50.

Figure 4:
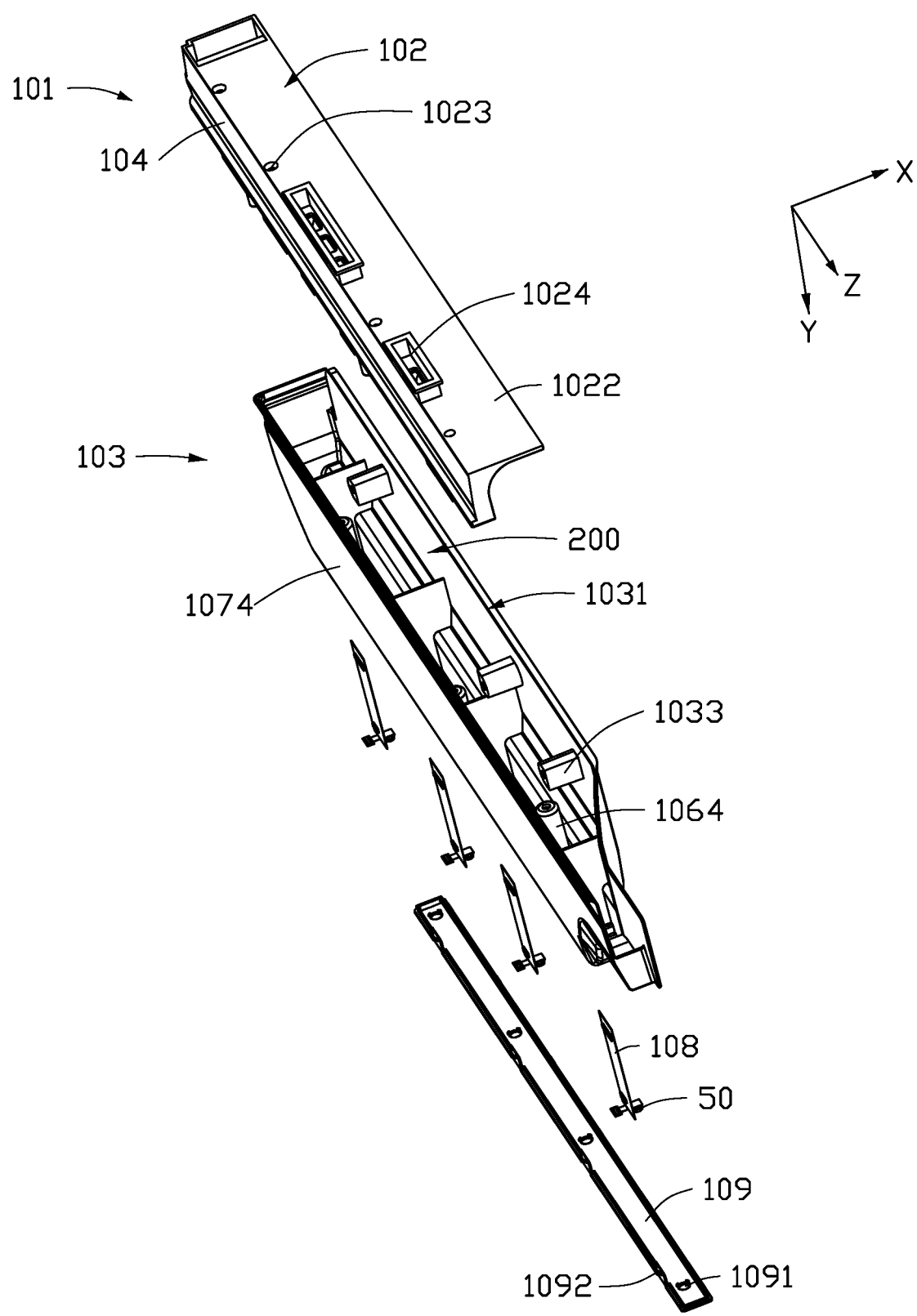
FIG. 4 is another exploded view of the camera assembly of FIG. 2.

Referring to FIGS. 2, 3, and 4, an intersecting surface of the locking base 101 is substantially L-shaped. The locking base 101 includes a bottom board 102 and a protruding portion 104. The bottom board 102 is substantially a rectangular board. The bottom board 102 includes a first surface 1021 facing the door 30 and a second surface 1022 facing away from the door 30.

The protruding portion 104 protrudes from an edge of the first surface 1021. In addition, the locking base 101 further includes an enforcing rib 1011. The enforcing rib 1011 is substantially L-shaped. The enforcing rib 1011 is between the bottom board 102 and the protruding portion 104, reinforcing a connection between the bottom board 102 and the protruding portion 104.

The bottom board 102 defines a plurality of locking holes 1023. The locking holes 1023 are for insertion of screws for locking the locking base 101 to the inner surface 301.

The bottom board 102 includes a plurality of blocks 1024 on the second surface 1022. The inner surface 301 includes a plurality of grooves (not shown) corresponding to the blocks 1024. Thus, the locking base 101 is coupled to the inner surface 301 through coupling the blocks 1024 into the grooves.

In another embodiment, the locking base 101 can be built into the inner surface 301, the protruding portion 104 then protruding from the inner surface 301.

The protruding portion 104 includes cabling grooves 1041 for securing cables of the camera assembly 10. The protruding portion 104 is substantially L-shaped and includes a sidewall substantially perpendicular to the bottom board 102 and a top wall substantially parallel to the bottom board 102. The top wall of the protruding portion 104 includes two protrusion walls 1042. The two protrusion walls 1042 and the top wall of the protruding portion 104 cooperatively form the cabling groove 1041.

The top wall of the protruding portion 104 further includes at least one positioning latch 1043. In at least one embodiment, the positioning latch 1043 is substantially M-shaped and is for positioning cables received in the cabling groove 1041, avoiding the cables becoming detached from the cabling groove 1041.

The bottom board 102 further includes at least one first outlet hole 1025. The top wall of the protruding portion 104 further includes at least one second outlet hole 1044. The at least one first outlet hole 1025 and the at least one second outlet hole 1044 are both for cable runs.

The securing base 103 is substantially rectangular and includes a top wall 105 and an external wall 107. The external wall 107 includes an upper external wall 1071, a lower external wall 1072, a left external wall 1073, and a right external wall 1074. The upper external wall 1071, the lower external wall 1072, the left external wall 1073, and the right external wall 1074 surround the top wall 105 and cooperatively form a receiving portion 200. The receiving portion 200 includes an opening 1031. The protruding portion 104 is received in the receiving portion 200 through the opening 1031.

The external wall 107 defines at least one first hole 1032 through the external wall 107. The external wall 107 includes at least one first connecting post 1033 positioned in the receiving portion 200. The first connecting post 1033 corresponds to the first hole 1032. One end of the first connecting post 1033 is perpendicular to the external wall 107, the other end of the first connecting post 1033 extends inwardly in the receiving portion 200. In at least one embodiment, the first connecting post 1033 is coupled to the left external wall 1073. Correspondingly, the protruding portion 104 includes at least one first mounting post 1015 corresponding to the first connecting post 1033. The first mounting post 1015 can be a bolt. A screw can be coupled to the first connecting post 1033 through the first hole 1032 and coupled into the first mounting post 1015, thereby, the securing base 103 is coupled to the locking base 101 in a first direction, such as an X-axis direction.

The top wall 105 of the securing base 103 defines a slot 106. The slot 106 is substantially rectangular. The slot 106 includes a bottom wall 1061 and a peripheral wall 1062. The slot 106 is for setting the camera 50. The slot 106 faces the body 20. Thus, the camera 50 set in the slot 106 can capture images of the goods in the body 20. In addition, the refrigerator 100 further includes a tablet computer (not shown). The tablet computer is coupled to the outer surface 303 of the door 30. The tablet computer is electrically connected to the camera 50 by wires or wirelessly and is for processing and storing images captured by the camera. Therefore, the user may view the goods in the refrigerator 100 when the door 30 is closed.

The slot 106 defines at least one second hole 1063 throughout the bottom wall 1061. The bottom wall 1061 includes at least one second connecting post 1064 in the receiving portion 200. The second connecting post 1064 is substantially a hollow column and corresponds to the second hole 1063. One end of the second connecting post 1064 is substantially perpendicularly connected to the bottom wall 1061, another end of the second connecting post 1064 extends inwardly in the receiving portion 200. Correspondingly, the protruding portion 104 includes at least one second mounting post 1017 corresponding to the second connecting post 1064. The second mounting post 1017 can be a bolt. A screw can be coupled to the second connecting post 1064 through the second hole 1063 and coupled into the second mounting post 1017, thereby, the securing base 103 can be coupled to the locking base 101 in a second direction, such as a Y-axis direction. The first direction is perpendicular to the second direction.

In other embodiments, the upper external wall 1071 includes a latching portion 1075. Correspondingly, the locking base 101 includes latching rib 1019 corresponding to the latching portion 1075. The securing base 103 is coupled to the locking base 101 in the second direction by means of the latching portion 1075 latching to the latching rib 1019.

For capturing images of the goods in the refrigerator 100, the upper external wall 1071 and the lower external wall 1072 of the securing base 103 are both in a third direction. That is, the camera 10 is in the third direction. The first direction, the second direction, and the third direction are perpendicular to each other. In at least one embodiment, the third direction is a Z-axis direction. Thus, when the camera assembly 10 is in the Z-axis direction and coupled to the inner surface 301 of the door 30, the camera 50 may be aligned to view all layers of the shelf 40 to make sure that all goods in the body 20 can be captured. Meanwhile, the camera assembly 10 is coupled to a joint of the door 30 and the body 20 and adjacent to an opening area of the door 30 so as not to affect other elements, such as a storing box 60, on the inner surface 301. The external wall 107 of the securing base 103 includes at least one projection 1076 for securing the storing box 60 on the door 30.

There are no other objects to block the image captures of the camera 50.

In other embodiments, the slot 106 further includes a plurality of baffles 1065. The baffles 1065 divide the slot 106 into a plurality of receiving slots 1066. The receiving slots 1066 are for receiving the camera 50. In details, each receiving slot 1066 corresponds to one layer of the shelf, thus the camera 50 may capture images of all goods in the body 20.

Figure 5:
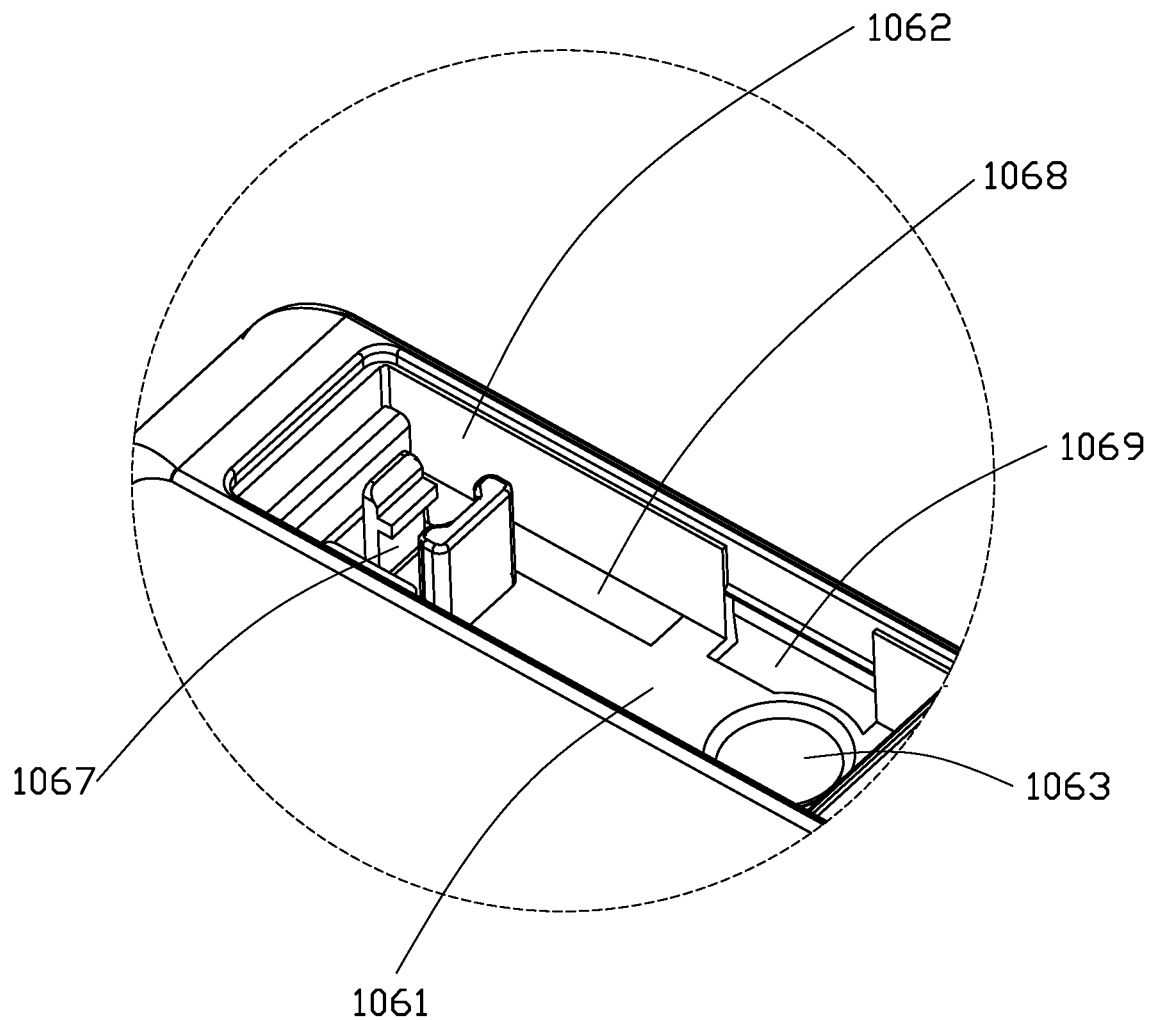
FIG. 5 is an enlarged view of a circled portion III of the camera assembly of FIG. 3.

FIG. 5 illustrates that the bottom wall 1061 includes at least one clip 1067 for clipping the camera 50. Particularly, the clip 1067 is substantially U-shaped.

The camera assembly 10 further includes at least one connector 108 for electrically connecting the camera 50 to other electronic elements on the door 30. Particularly, the connector 108 is substantially sheet-shaped. Correspondingly, the receiving slots 1066 define at least one via 1068 for receiving the connector 108. The via 1068 is adjacent to the clip 1067. When an end of the connector 108 that is not connected to the camera 50 is inserted through the via 1068, the camera 50 can be clipped into the clip 1067.

In other embodiments, the securing base 103 further includes a cover 109. The cover 109 covers the slot 106 and is for securing the camera 50. The cover 109 defines at least one aperture 1091 corresponding to the camera 50. The aperture 1091 is for exposing the camera 50 from the cover 109. Thus, the cover 109 may secure the camera 50 and not block the view of the camera 50.

In at least one embodiment, the cover 109 is coupled to the securing base 103 by latching. The cover 109 further includes a plurality of latching pieces 1092 on a peripheral edge. The slot 106 includes a plurality of latching slots 1069 on the peripheral wall 1062. The latching pieces 1092 are latched to the latching slots 1069, thus the cover 109 can be coupled the securing base 103. Other connection means, such as adhesion or threaded connection, are also available for the cover 109 and the securing base 103.

The camera assembly 10 can be assembled in following steps:

Step I, the refrigerator 100 is provided. The refrigerator 100 includes a camera assembly 10, a body 20, a door 30, a shelf 40, and a tablet computer (not shown). The door 30 is coupled to the body 20. The shelf 40 is secured in the body 20. The tablet computer (not shown) is secured in an outer surface 303 of the door 30. The camera assembly 10 includes a camera 50, a locking base 101, and a securing base 103.

Step II, coupling the securing base 103 to the locking base 101.

The intersecting surface of the locking base 101 is substantially L-shaped. The locking base 101 includes a bottom board 102 and a protruding portion 104. The bottom board 102 is substantially a rectangular board. The bottom board 102 includes a first surface 1021 facing the door 30 and a second surface 1022 facing away from the door 30.

The securing base 103 is substantially rectangular and includes a top wall 105 and an external wall 107. The external wall 107 includes an upper external wall 1071, a lower external wall 1072, a left external wall 1073, and a right external wall 1074. The upper external wall 1071, the lower external wall 1072, the left external wall 1073, and the right external wall 1074 surround the top wall 105 and cooperatively form a receiving portion 200. The receiving portion 200 includes an opening 1031. The protruding portion 104 is received in the receiving portion 200 through the opening 1031.

The external wall 107 defines at least one first hole 1032 through the external wall 107. The external wall 107 includes at least one first connecting post 1033 positioned in the receiving portion 200. The first connecting post 1033 is corresponding to the first hole 1032. One end of the first connecting post 1033 is perpendicular to the external wall 107, the other end of the first connecting post 1033 extends inwardly in the receiving portion 200. In at least one embodiment, the first connecting post 1033 is coupled to the left external wall 1073. Correspondingly, the protruding portion 104 includes at least one first mounting post 1015 corresponding to the first connecting post 1033. The first mounting post 1015 can be a bolt. A screw can be coupled to the first connecting post 1033 through the first hole 1032 and coupled into the first mounting post 1015, thereby, the securing base 103 can be coupled to the locking base 101 in a first direction, such as an X-axis direction.

The top wall 105 of the securing base 103 defines a slot 106. The slot 106 is substantially rectangular. The slot 106 includes a bottom wall 1061 and a peripheral wall 1062. The slot 106 defines at least one second hole 1063 through the bottom wall 1061. The bottom wall 1061 includes at least one second connecting post 1064 in the receiving portion 200. The second connecting post 1064 is substantially a hollow column and corresponds to the second hole 1063. One end of the second connecting post 1064 is substantially perpendicularly connected to the bottom wall 1061, another end of the second connecting post 1064 extends inwardly in the receiving portion 200. Correspondingly, the protruding portion 104 includes at least one second mounting post 1017 corresponding to the second connecting post 1064. The second mounting post 1017 can be a bolt. A screw can be coupled to the second connecting post 1064 through the second hole 1063 and coupled into the second mounting post 1017, thereby, the securing base 103 can be coupled to the locking base 101 in a second direction, such as a Y-axis direction. The first direction is perpendicular to the second direction.

Step III, coupling the camera 50 to the securing base 103. positioning the camera 50 in the slot 106.

The slot 106 further includes a plurality of baffles 1065. The baffles 1065 divide the slot 106 into a plurality of receiving slots 1066. The receiving slots 1066 are for receiving the camera 50. In details, each receiving slot 1066 corresponds to one layer of the shelf, thus the camera 50 may capture images of all goods in the body 20.

The bottom wall 1061 includes at least one clip 1067 for clipping the camera 50. Particularly, the clip 1067 is substantially U-shaped.

The camera assembly 10 further includes at least one connector 108 for electrically connecting the camera 50 to other electronic elements on the door 30. Particularly, the connector 108 is substantially sheet-shaped. Correspondingly, the receiving slots 1066 define at least one via 1068 for receiving the connector 108. The via 1068 is adjacent to the clip 1067. When an end of the connector 108 that is not connected to the camera 50 is inserted through the via 1068, the camera 50 can be clipped into the clip 1067.

Step IV, assembling cover.

The camera assembly 10 further includes a cover 109. The cover 109 covers the slot 106 and is for securing the camera 50. The cover 109 defines at least one aperture 1091 corresponding to the camera 50. The aperture 1091 is for exposing the camera 50 from the cover 109. Thus, the cover 109 may secure the camera 50 and not block the view of the camera 50.

In at least one embodiment, the cover 109 is latched to the securing base 103. The cover 109 further includes a plurality of latching pieces 1092 on a peripheral edge. The slot 106 includes a plurality of latching slots 1069 on the peripheral wall 1062. The latching pieces 1092 can latch to the latching slots 1069, thus the cover 109 can be coupled the securing base 103. Other connection means, such as adhesion or threaded connection, are also available for the cover 109 and the securing base 103.

Step V, coupling the camera assembly 10 to the inner surface 301 of the door 30.

The bottom board 102 includes a plurality of blocks 1024 on the second surface 1022. The inner surface 301 includes a plurality of grooves (not shown) corresponding to the blocks 1024. Thus, the locking base 101 is coupled to the inner surface 301 through coupling the blocks 1024 into the grooves.

For capturing images of all the goods in the refrigerator 100, the upper external wall 1071 and the lower external wall 1072 of the securing base 103 are both in a third direction. That is, the camera 10 is in the third direction. The third direction is a Z-axis direction. Thus, when the camera assembly 10 is in the Z-axis direction and coupled to the inner surface 301 of the door 30, the camera 50 may be aligned to all layers of the shelf 40 to make sure that images of all goods in the body 20 can be captured. Meanwhile, the camera assembly 10 is coupled to a joint of the door 30 and the body 20 and adjacent to an opening area of the door 30. Thus other elements, such as a storing box 60 on the inner surface 301, are not affected. There are no other objects blocking the view of the camera 50.

In other embodiments, firstly, the locking base 101 is secured and secondly, the securing base 103 is coupled to the locking base 101 through the protruding portion 104. Thus, extra step can be added before step II for securing the locking base 101, and step V can be omitted.

Securing the locking base 101 can be done in following two manners:

Manner I, the bottom board 102 defines a plurality of locking holes 1023. The locking holes 1023 are for insertion of screws for locking the locking base 101 to the inner surface 301.

Manner II, the locking base 101 can be built into the inner surface 301, the protruding portion 104 protruding from the inner surface 301.

In general, the camera assembly 10 is secured on the inner surface 301 of the door 30, for capturing images of the goods in the refrigerator 100. The camera assembly 10 is in the Z-axis direction and coupled to the inner surface 301 of the door 30, thus the camera 50 may be aligned to view all layers of the shelf 40 to make sure that images of all goods in the body 20 can be captured. Meanwhile, the camera assembly 10 is coupled to a joint of the door 30 and the body 20 and adjacent to an opening area of the door 30, so as not to affect other elements. In addition, the camera assembly 10 has a simple structure and can be easily assembled.

It is believed that the exemplary embodiments and their advantages will be understood from the foregoing description, and it will be apparent that various changes may be made thereto without departing from the scope of the disclosure or sacrificing all of its advantages. The examples herein described are mere illustrative exemplary embodiments of the disclosure.

What is claimed is:

1. A camera assembly coupled to a door of a refrigerator, the camera assembly comprising:
a locking base coupled to the door, the locking base comprising a protruding portion;
a securing base coupled to the locking base; and
a camera received in the securing base;
wherein the securing base comprises a top wall and an external wall, the external wall surrounds the top wall and cooperatively form a receiving portion, the top wall defines a slot for receiving the camera, the external wall comprises at least one first connecting post, the at least one first connecting post is positioned in the receiving portion, the protruding portion comprises at least one first mounting post corresponding to the at least one first connecting post, the at least one first mounting post is coupled to the at least one first connecting post to secure the securing base to the locking base in a first direction; and
wherein the slot further comprises at least one second connecting post, the at least one second connecting post is positioned in the receiving portion, the protruding portion further comprises at least one second mounting post corresponding to the at least one second connecting post, the at least one second mounting post is coupled to the at least one second connecting post to secure the securing base to the locking base in a second direction.

2. The camera assembly as claimed in claim 1, wherein the locking base further comprises a bottom board, the bottom board is coupled to the door, the protruding portion is perpendicular to the bottom board.

3. The camera assembly as claimed in claim 2, wherein the receiving portion comprises an opening, the protruding portion is received in the receiving portion through the opening, the bottom board of the locking base covers the opening.

4. The camera assembly as claimed in claim 3, wherein the external wall further comprises at least one first hole throughout the external wall, the at least one first connecting post is corresponding to the at least one first hole.

5. The camera assembly as claimed in claim 4, wherein the slot comprises a bottom wall and a peripheral wall, the slot further comprises at least one second hole throughout the bottom wall, the at least one second connecting post is corresponding to the at least one second hole, the first direction is perpendicular to the second direction.

6. The camera assembly as claimed in claim 5, wherein the securing base further comprises at least one clip for clipping the camera, the at least one clip is formed on the bottom wall of the slot, the at least one clip is U-shaped.

7. The camera assembly as claimed in claim 2, wherein the locking base further comprises an enforcing rib, the enforcing rib is L-shaped, the enforcing rib is between the bottom board and the protruding portion, the enforcing rib is for enforcing a connection between the bottom board and the protruding portion.

8. The camera assembly as claimed in claim 3, wherein the securing base further comprises a cover, the cover defines at least one aperture corresponding to the camera, the cover covers the slot, the camera is inserted through the at least one aperture and exposed from the cover.

9. A refrigerator comprising:
a body;
a door coupled to the body; and
a camera assembly coupled to the door, the camera assembly comprising:
a locking base coupled to the door, the locking base comprising a protruding portion;
a securing base coupled to the locking base; and
a camera received in the securing base;
wherein the securing base comprises a top wall and an external wall, the external wall surrounds the top wall and cooperatively form a receiving portion, the top wall defines a slot for receiving the camera, the external wall comprises at least one first connecting post, the at least one first connecting post is positioned in the receiving portion, the protruding portion comprises at least one first mounting post corresponding to the at least one first connecting post, the at least one first mounting post is coupled to the at least one first connecting post to secure the securing base to the locking base in a first direction; and
wherein the slot further comprises at least one second connecting post, the at least one second connecting post is positioned in the receiving portion, the protruding portion further comprises at least one second mounting post corresponding to the at least one second connecting post, the at least one second mounting post is coupled to the at least one second connecting post to secure the securing base to the locking base in a second direction.

10. The refrigerator as claimed in claim 9, wherein the locking base further comprises a bottom board, the bottom board is coupled to the door, the protruding portion is perpendicular to the bottom board.

11. The refrigerator as claimed in claim 10, wherein the receiving portion comprises an opening, the protruding portion is received in the receiving portion through the opening, the bottom board of the locking base covers the opening.

12. The refrigerator as claimed in claim 11, wherein the external wall further comprises at least one first hole throughout the external wall, the at least one first connecting post is corresponding to the at least one first hole.

13. The refrigerator as claimed in claim 12, wherein the slot comprises a bottom wall and a peripheral wall, the slot further comprises at least one second hole throughout the bottom wall, the at least one second connecting post is corresponding to the at least one second hole, the first direction is perpendicular to the second direction.

14. The refrigerator as claimed in claim 13, wherein the securing base further comprises at least one clip for clipping the camera, the at least one clip is formed on the bottom wall of the slot, the at least one clip is U-shaped.

15. The refrigerator as claimed in claim 10, wherein the locking base further comprises an enforcing rib, the enforcing rib is L-shaped, the enforcing rib is between the bottom board and the protruding portion, the enforcing rib is for reinforcing a connection between the bottom board and the protruding portion.

16. The refrigerator as claimed in claim 11, wherein the securing base further comprises a cover, the cover defines at least one aperture corresponding to the camera, the cover covers the slot, the camera is inserted through the at least one aperture and exposed from the cover.

17. The refrigerator as claimed in claim 9, wherein the camera assembly is coupled to a joint of the door and the body and adjacent to an opening area of the door.

18. A camera assembly coupled to a door of a refrigerator, the camera assembly comprising:
a locking base, the locking base comprising a bottom board and a protruding portion, wherein the bottom board is coupled to the door, the protruding portion is perpendicular to the bottom board;
a securing base coupled to the locking base; and
a camera received in the securing base;
wherein the securing base comprises a top wall and an external wall, the external wall surrounds the top wall and cooperatively form a receiving portion, the receiving portion defines an opening, the protruding portion is received in the receiving portion through the opening, and the bottom board of the locking base covers the opening;
wherein the external wall further comprises at least one first hole throughout the external wall and at least one first connecting post, the at least one first connecting post is corresponding to the at least one first hole, the at least one first connecting post is positioned in the receiving portion, the protruding portion comprises at least one first mounting post corresponding to the at least one first connecting post, the at least one first mounting post is coupled to the at least one first connecting post to secure the securing base to the locking base in a first direction;
wherein the top wall defines a slot for receiving the camera, the slot comprises a bottom wall and a peripheral wall, the slot further comprises at least one second hole throughout the bottom wall and at least one second connecting post, the at least one second connecting post is corresponding to the at least one second hole, the at least one second connecting post is positioned in the receiving portion, the protruding portion comprises at least one second mounting post corresponding to the at least one second connecting post, the at least one second mounting post is coupled to the at least one second connecting post to secure the securing base to the locking base in a second direction.

19. The camera assembly as claimed in claim 18, wherein the first direction is perpendicular to the second direction.

\* \* \* \* \*